United States Patent
Giannopoulos et al.

(10) Patent No.: US 6,421,256 B1
(45) Date of Patent: Jul. 16, 2002

(54) METHOD FOR REDUCING MAINS HARMONICS AND SWITCHING LOSSES IN DISCONTINUOUS-MODE, SWITCHING POWER CONVERTERS

(75) Inventors: Demetri Giannopoulos; Qiong Li, both of Briarcliff Manor, NY (US)

(73) Assignee: Koninklijke Philips Electronics N.V., New York, NY (US)

( * ) Notice: Subject to any disclaimer, the term of this patent is extended or adjusted under 35 U.S.C. 154(b) by 0 days.

(21) Appl. No.: 09/888,457

(22) Filed: Jun. 25, 2001

(51) Int. Cl.[7] ............................................... H02M 3/335
(52) U.S. Cl. ...................................... 363/21.12; 363/20
(58) Field of Search ............................ 363/40, 41, 37, 363/97, 89, 20, 21.06, 16, 17; 323/222, 284, 288

(56) References Cited

U.S. PATENT DOCUMENTS

| | | | | |
|---|---|---|---|---|
| 4,525,774 A | * | 6/1985 | Kino et al. ................... | 363/17 |
| 4,758,937 A | * | 7/1988 | Usui et al. ................... | 363/19 |
| 5,264,780 A | | 11/1993 | Bruer et al. ................. | 323/222 |
| 5,535,112 A | * | 7/1996 | Vazquez Lopez et al. ..... | 363/20 |
| 5,991,172 A | | 11/1999 | Jovanovic et al. ............ | 363/21 |
| 5,995,383 A | * | 11/1999 | Poon et al. ................... | 363/89 |

FOREIGN PATENT DOCUMENTS

| | | |
|---|---|---|
| EP | 0505982 A1 | 9/1992 |
| EP | 0757428 A1 | 2/1997 |

* cited by examiner

*Primary Examiner*—Rajnikant B. Patel
(74) *Attorney, Agent, or Firm*—Steven R. Biren

(57) ABSTRACT

A method for reducing harmonic distortions and switching losses in a power factor correction circuit of a quasi-resonant voltage converter, wherein using data derived from the sensing a voltage impressed on the switching device in the power converter, a multitude of event times can be calculated that will align the timings of the drive circuitry of the power converter to those of the natural resonance transitions of reactive elements of the converter. An over-sampling of the voltage impressed on the switching device voltage allows accurate sensing of a "zero-current" cross-over condition in an inductance of the converter.

20 Claims, 4 Drawing Sheets

METHOD FOR REDUCING MAINS HARMONICS AND SWITCHING LOSSES IN DISCONTINUOUS-MODE, SWITCHING POWER CONVERTERS

FIELD OF THE INVENTION

This invention relates to the field of electronic power converters, and more particularly to a method for improving power factor correction circuits.

BACKGROUND OF THE INVENTION

In conventional switched power converter circuits, a large input voltage filtering capacitance introduces a significant phase difference between the input voltage and the input current, and in conjunction with input rectifiers, introduces harmonic distortions in the input current signal. Since such phase shifts can create performance degradations at upstream power distribution facilities, power factor correction (PFC) circuits are often employed to minimize this reactive phase shift and bring the current and voltage signals into phase alignment.

One conventional PFC implementation uses a critical boundary mode (CBM) of operation, wherein the input filtering capacitance is eliminated to allow a sinusoidal input voltage waveform to be applied to a converter switching circuit. This switching circuit comprises a power switching device that alternately turns on and off to charge and discharge a magnetic component, such as a transformer. A ratio of the on and off times periods of the converter provides a transformed voltage to an output of the magnetic component. Since the input voltage is not buffered, input current is shaped, such that it is in phase and proportional to the input voltage.

Disadvantageously, such applications typically use a constant on-time and vary the off-time to achieve the desired timing ratio. Such a constant on-time creates distortions in the input current waveform, since a peak current in the magnetic component in a given period is a function of the voltage applied across that magnetic component. As the un-buffered input voltage envelope traces a sinusoidal waveform at a frequency in the hundreds of Hertz, a multitude of on-off switching cycles occurring at a 10 K–100 KHz frequency will each have a different input voltage and thus a different peak and average input current. This current variation creates a distortion in the envelope of the input current due to harmonic frequencies of the converter.

A simple and inexpensive configuration that is typically used for low-to-medium power applications features a single switching device and a single transformer operating in a flyback mode. The operation of a flyback converter involves turning on the switching device to impress an input voltage across the transformer. The current through the transformer will linearly rise to a predetermined value, at which time the device is turned off. The voltage on the transformer then flies back past the applied input voltage in order to linearly discharge that magnetization current back to zero. A secondary output winding of the transformer typically provides the conduction path for this discharge.

A zero-current sensing circuit, which can be implemented as an auxiliary winding in the transformer, is used to detect such a zero current condition, at which time the switching device is turned on for the next cycle. In addition to providing an appropriate regulation time for the next turn-on, the zero-current sensing circuit can also provide an optimum point for minimizing transient power dissipation in the switching device. Disadvantageously, such an auxiliary winding in the transformer adds to the cost and design complexity in the power converter.

A further disadvantage of the above effects is that they are dependent on variations in the input voltage supplied to the power converter. This dependency creates degradation in the regulation and responsiveness of the power converter.

SUMMARY

A method for reducing harmonic distortions and switching losses in a power factor correction circuit of a flyback power converter wherein optimal time periods, $t_{on}$, $t_{off}$, and $t_d$ are calculated based on the operating parameters of the power system. By balancing these three time periods, the operation of the drive circuitry can be aligned with natural resonance signals that are associated with the reactive elements of the converter. The data for deriving the three time periods can be obtained by monitoring a voltage waveform at a switched node of a transformer of the power converter.

DETAILED DESCRIPTION OF THE INVENTION

Conventional voltage converters having power factor correction (PFC) circuits are characterized by either 1) a low efficiency due to insufficiently controlled switching losses or 2) an input current signal having harmonic distortions. According to a preferred embodiment of the present invention, by employing a discontinuous mode of operation, an on-time $T_{on}$, an off-time $T_{off}$, and a discontinuity-time $T_d$ can be optimally selected to allow for the operation of the converter at a point that minimizes both switching losses and the harmonic distortions.

Figure 1:
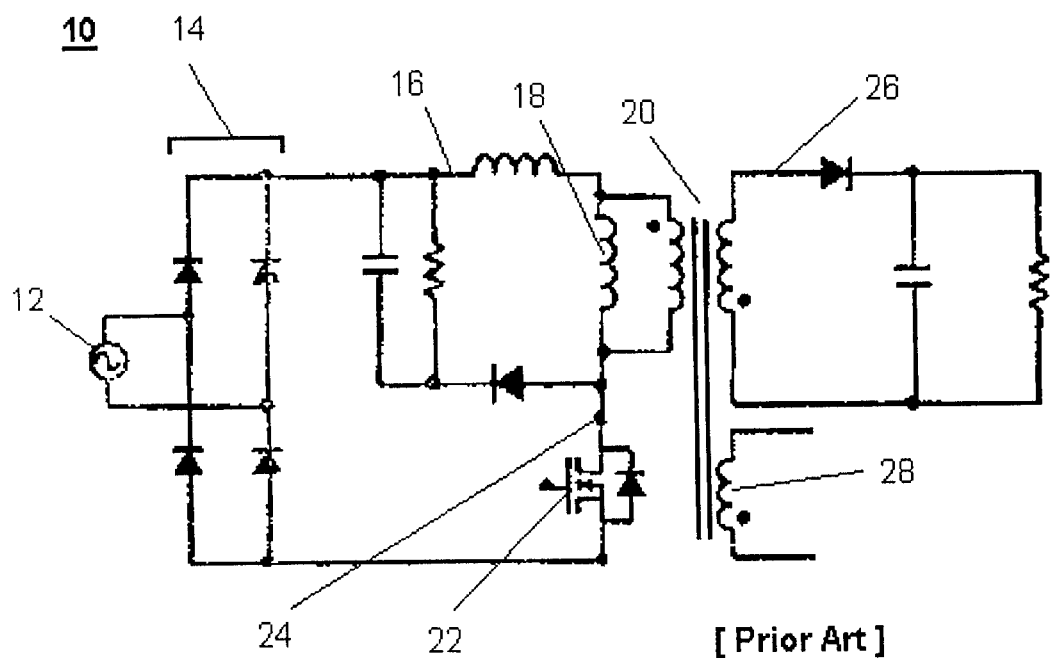
FIG. 1 shows a circuit diagram of a conventional flyback power converter having power factor correction.
Figure 2:
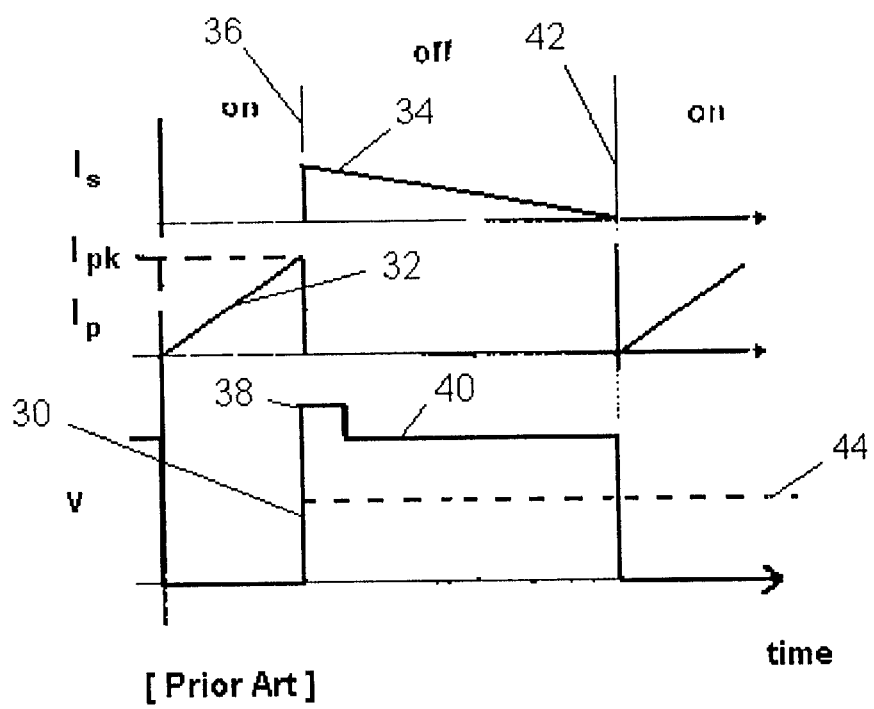
FIG. 2 shows a plot of switching current and voltage signals vs. time over a single operational cycle of the circuit shown in FIG. 1.

FIG. 1 shows an exemplary circuit diagram of a conventional flyback power converter 10 having PFC. A sinusoidal voltage signal 12 is rectified by full-wave rectifier bridge 14 to produce a half-wave voltage signal 16. Signal 16 is impressed across a primary winding inductance 18 of a flyback transformer 20 by a semiconductor switching device 22. A simplified impressed voltage signal at a node 24 could be characterized as having the input voltage applied across transformer 20 during an on-time of switch 22 and wherein inductor 18 is charged, followed by an inverted reflection of the output voltage 26 displayed during an off-time of switch 22, wherein inductor 18 is discharged, as shown in FIG. 2. Also shown in FIG. 1 is a sense winding 28 of transformer 20 which can be used in some flyback applications to detect the end of the discharge time i.e., a zero current condition.

FIG. 2 shows a plot of switching voltage signal 30, a transformer primary magnetization current signal 32, and a transformer secondary magnetization current signal 34 vs. time over an operational cycle of converter 10 shown in FIG. 1. In a typical embodiment using an FET as switching device 22, when switch 22 is turned "on" by a control circuit (not shown), a primary magnetization current 32 to begin rising in inductance 18. Magnetization current 32 rises linearly until a predetermined turn-off time 36 at which a peak current $I_{pk}$ is reached, and switch 22 is turned "off".

At time 36, the voltage across inductance 18 "flies back" past the input voltage level 16 (as indicated as dotted line 44). After an initial voltage overshoot 38, a voltage signal at node 24 settles at a reverse voltage "plateau" 40 while the magnetization current through inductor 18 is linearly discharged toward zero which occurs at time 42. For an application using a critical boundary mode (CBM) of operation, switch 22 is turned on at time 42 for a next cycle.

Figure 3:
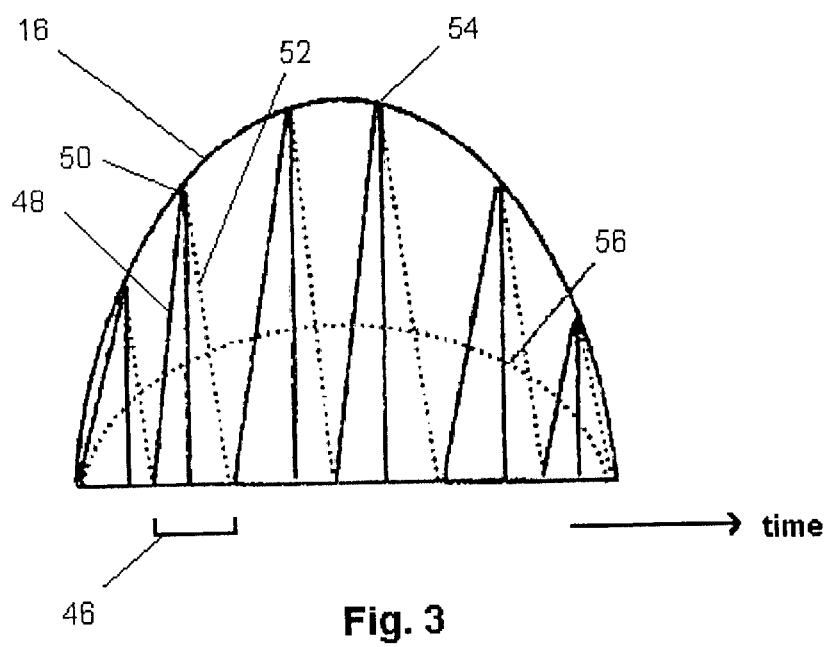
FIG. 3 shows a plot of input voltage and current signals vs. time over a multitude of operational cycles of the circuit shown in FIG. 1.

FIG. 3 shows a plot of input voltage and current signals vs. time over a multitude of operational cycles of the circuit shown in FIG. 1. An envelope of rectified input voltage signal 16 provides the applied voltage for each cycle 46 of power converter 10. During a representative cycle time 46, current segment 48 (solid line) represents the rising current 32 of FIG. 2 through switch 22 and inductance 18 during the "on" time, peaking at current level 50, and discharging as secondary winding current segment 52 (dotted line) during the "off" time.

Since the multitude of cycles 46 are of equal on-time duration, the peak current drawn from input signal 12 by converter 10 during any cycle is proportional to the voltage 16 impressed on inductance 18. During a cycle having a higher impressed voltage, such as that peaking at point 54, the associated current also rises to a proportionately higher peak. Curve 56 represents the average of the currents over the half cycle. As can be seen, the envelope of average current 56 is in phase with voltage 16 (i.e. the average current peaks simultaneously with the voltage signal.)

This average input current can be described by the equation $$I_{in}(ave) = (1/2T) * I_{pk} * T_{on} = \left(\frac{1}{2}\right) * \frac{T_{on}}{[L_m + L_{lk}]\left[1 + \frac{V_{in}}{V_r}\right]} \cdot V_{in} \quad [1]$$

where $I_{in}(ave)$ is the average input current over a single cycle, $I_{pk}$ is the current peak attained at the end of an on-time, T is the cyclic period, $T_{on}$ is the time that switch 22 is activated (i.e. turned on), $L_m$ is the magnetization inductance 18 of transformer 20, $L_{lk}$ is a leakage inductance of tranformer 20, $V_{in}$ is the rectified input voltage 16, and $V_r$ is the reflected secondary voltage.

It should be noted that over the duration of any one cycle, $V_{in}$ and $V_r$ can be assumed to be constant. For clarity, voltage and current in equation [1] are represented by upper case letters even though they are time-variant signals and would normally be represented with lower case letters.

Disadvantageously, in fixed $T_{on}$ conventional power converters, such as that shown in FIG. 1, $T_{on}$ and $T_{off}$ are fixed by the ratio of the output power to the input voltage and current applied to the transformer (i.e. voltage 30 and current 32). For a fixed output voltage, $V_r$, such a fixed $T_{on}$ produces an input current that is non-linearly dependent on the input voltage, thereby creating distortions in the input current waveform and degradation in the power factor correction performance.

Figure 4:
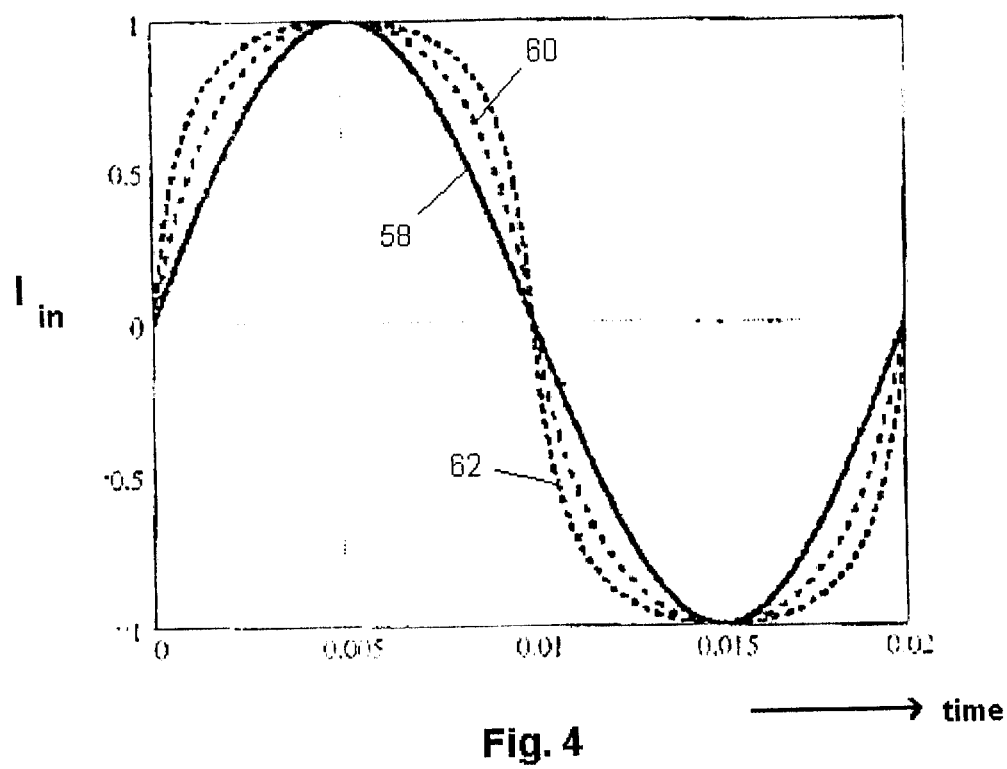
FIG. 4 shows a plot of normalized input current vs. time for different input line voltage for the circuit shown in FIG. 1.

FIG. 4 shows a plot of normalized input current vs. time for different exemplary input voltages for the circuit shown in FIG. 1. An idealized sinusoidal input current signal 58 would result from optimized power factor correction that is independent of the input voltage. Using equation [1], an input voltage of 90 and 270 volts would produce deviations from the true sinusoid signal 58, such as the normalized input current signals 60 and 62, respectively, due to the effects associated with the input voltage term. This distortion in the current produces significant harmonic distortion in the system loading of such a power converter.

In a preferred embodiment according to the present invention, the $T_{on}$ is allowed to vary to compensate for changes in input voltage signal and nullify any associated harmonic distortions in the input current signal. This $T_{on}$ can be more correctly calculated to include any effects that are associated with parasitic reactive impedances present in the circuit. Measurement and inclusion of these additional impedances allows an accurate determination of an appropriate time delay between turn-on times in order to minimize transient switching losses.

Also in the preferred embodiment, an additional time period is added to allow for the balancing of the $T_{on}$ and $T_{off}$ times according to requirements of the regulating feedback loop. This time period is a portion of the $T_{off}$ time and is a period of energy transfer inactivity, or a discontinuity $T_d$.

Figure 5:
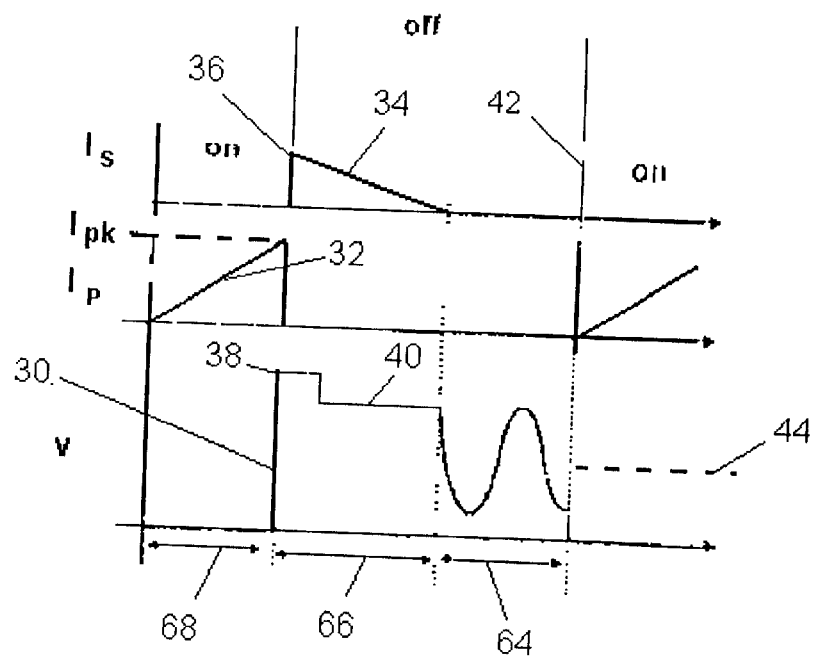
FIG. 5 shows a plot of switching current and voltage signals vs. time over a single operational cycle according to the present invention.

FIG. 5 shows a plot of switching current and voltage signals vs. time over a single operational cycle according to a preferred embodiment of the present invention. The timings and actions of FIG. 5 are identical to those shown in FIG. 2, except that at time 42 (the end of the discharge activity), switching device 22 is not turned on immediately. Instead, time 42 is delayed until the end of the discontinuity time $T_d$ 64, wherein the transformer will go into a relaxed mode characterized by an oscillation based on a natural resonance of parasitic elements of the converter. Thus, as shown in FIG. 5, a cycle will be comprised of a turn-on time 68, a discharge time 66, and a discontinuity time 64.

A sinusoidal segment of voltage waveform 30 shown during $T_d$ 64 is centered on the input voltage 44, and causes parasitic currents to flow in these parasitic elements. If switching device 22 is turned on during a current-flow portion of these oscillations, switching device 22 would necessarily have to provide that current at a time of high voltage. This would produce transient power spikes that can damage switching device 22 and/or significantly reduce the efficiency of the converter. Accordingly, switching device 22 is prevented from turning on until a point of zero current flow to prevent these transient spikes from occurring.

Figure 6:
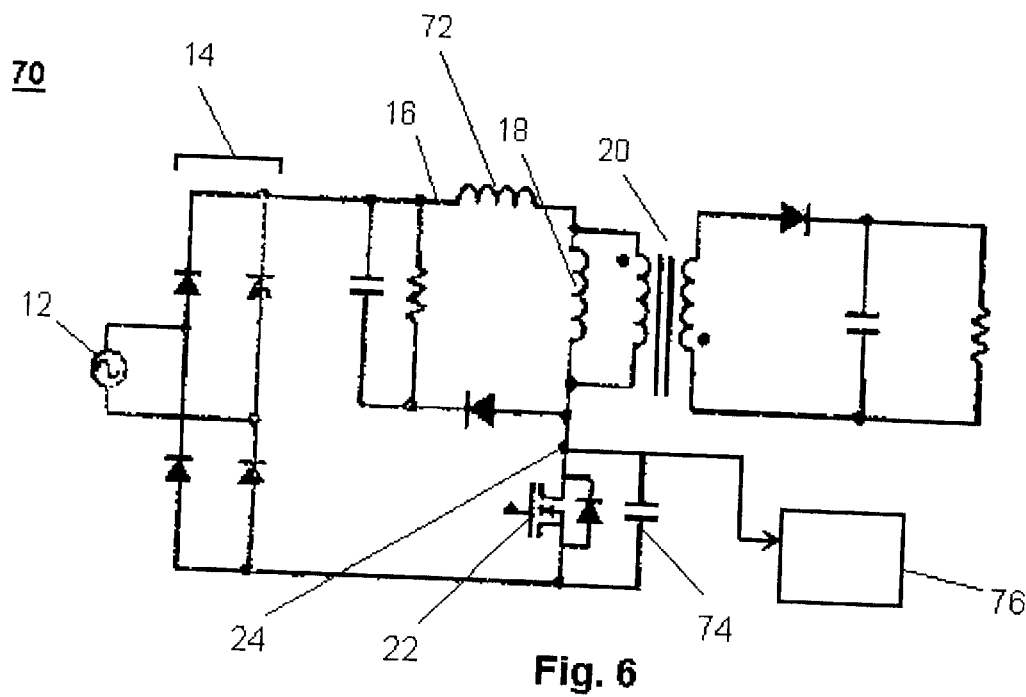
FIG. 6 shows a circuit diagram of a preferred embodiment of a quasi-resonant flyback power factor correction apparatus according to the present invention.

FIG. 6 shows a circuit diagram 70 of a preferred embodiment of a quasi-resonant flyback power factor correction apparatus according to the present invention. In addition to the power converter elements shown in FIG. 1, a leakage inductance, $L_{lk}$, 72 is measured and an associated data value is stored preferably in memory for use in a repetitive evaluation for an on-time duration using the equation $$I_{in}(ave) = \left(\frac{1}{2}\right) * \frac{(T_{on})^2}{[L_m + L_{lk}]\left[T_d + T_{on}\left(1 + \frac{V_{in}}{V_r}\right)\right]} \cdot V_{in} \quad [2]$$

where $I_{in}(ave)$ is the average input current over a line cycle.

A principal means for measuring leakage inductance 72 can be via the inclusion of a resonance capacitor 74 that is significantly larger than any parasitic capacitance that is associated with transformer 20. An accurate measurement of the voltage waveform 30 in FIG. 5 will extract a periodicity of resonance activity in discontinuity time 64, and from the known capacitor 74, the magnetization and leakage inducatanes can be derived.

Including the leakage inductances, for circuit 70, an appropriate on-time, $T_{on}$, can be derived by the equation $$T_{on} = T_k \sqrt{T_k^2 + 2k(L_m + L_{lk}) * T_d} \quad [3]$$

where $$k = \frac{(T_{on})^2}{[L_m + L_{lk}]\left[T_d + T_{on}\left(1 + \frac{V_{in}}{V_r}\right)\right]} \quad \text{and} \quad [4]$$

$$T_k = k(L_m + L_{lk})\left(1 + \frac{V_{in}}{V_r} \cdot \frac{L_m}{(L_m + L_{lk})}\right), \quad [5]$$

where $L_{lk}$ is the cumulative leakage inductance of the multitude of components connected to the exemplary drain of switch 22 and the specific printed circuit board layout impedances associated with those components, $t_{on}$, is selected such that k is a constant obtained from a regulating feedback loop to minimize the effects of $V_{in}$, and $T_d$ can chosen such that the turn-on of the switch coincides with a resonant valley of the switch drain voltage. Although the resonant "valley" is preferably chosen as the point of turn-on of switching device 22 since the resonant current is passing through zero at that time, other voltages and/or currents can be selected depending on the particular operating tradeoffs in the design of converter 70.

By monitoring and analyzing the voltage waveform at node 24 with a sampling circuit 76, all of the parameters needed for evaluating equations 2 through 5 can be obtained as is known in the art. For example, from an exemplary voltage waveform such as voltage waveform 30 shown in FIG. 5, and input voltage $V_{in}$ 16 can be derived by averaging the maximum and minimum values of the secondary oscillation during discontinuity time 64, and output reflected voltage $V_r$ can be represented as the difference between the input voltage $V_{in}$ and the plateau voltage 40. Thus, sampling circuit 76 can be a simple semiconductor amplifier or a sophisticated sample/hold device. It need only be sufficiently fast to ascertain the secondary resonance frequency and associated waveshape during the discontinuity period $T_d$ 64.

Such monitoring activity can occur during the operation of the converter on a continual basis, or with the exception of $V_{in}$, the parameter values could be measured at the time of manufacture and semi-permanently stored in a Read-Only-Memory (ROM) device or a reprogramable semiconductor device such as a PROM or an EEPROM, or even removable magnetic or optical media. In the preferred embodiment, $V_{in}$ could be continually monitored and the stored as necessary using a either conventional sampling means (not shown) or via analysis of the voltage waveform at node 24.

The preferred embodiment shown in FIG. 6 provides excellent power factor correction. A resultant input current waveform in such an embodiment. can be characterized by a signal that is substantially identical to the idealized current signal 58 shown in FIG. 4.

Figure 7:
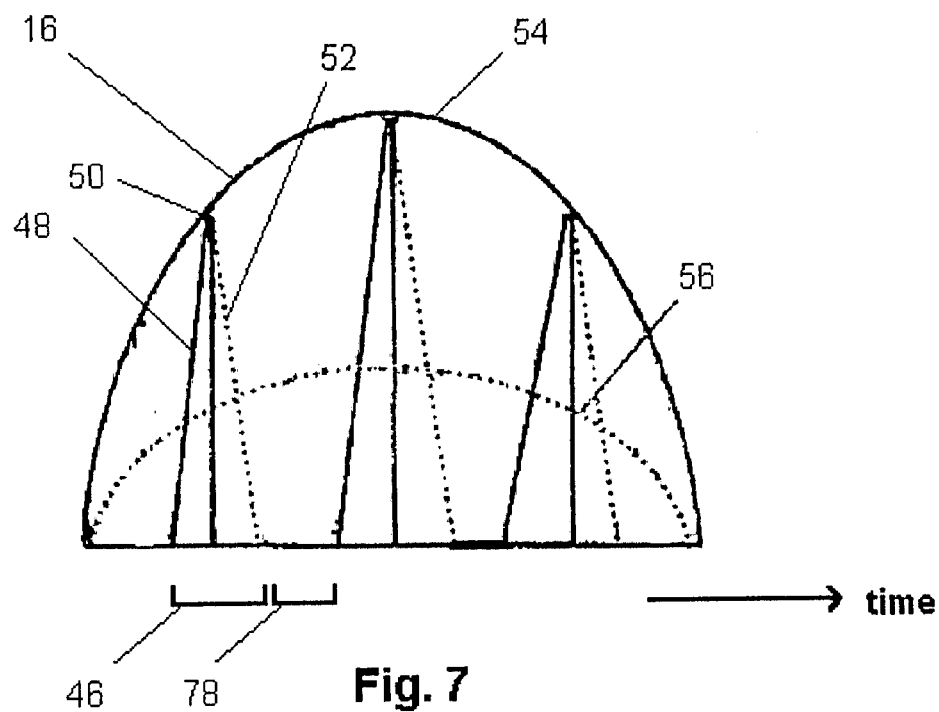
FIG. 7 shows a plot of input voltage and current signals vs. time over a multitude of operational cycles of the circuit shown in FIG. 6.

FIG. 7 shows a plot of input voltage and current signals vs. time over a multitude of operational cycles of the circuit shown in FIG. 6. FIG. 7 is identical to FIG. 3 except that a discontinuity time 78 is present during each cycle.

Figure 8:
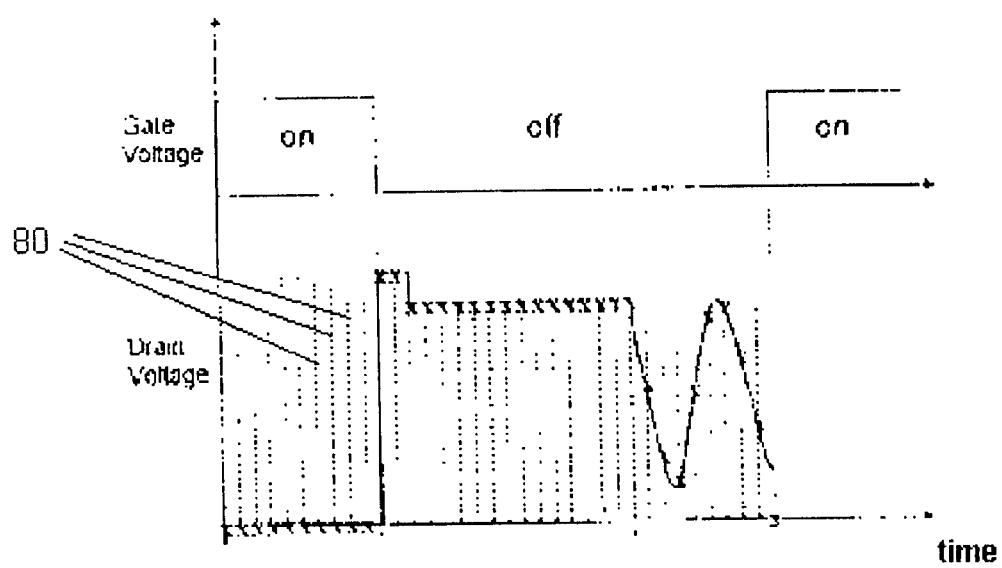
FIG. 8 shows a sampling plot of switching drain voltage signal vs. time for the power switching device shown in FIG. 6 over a single operational cycle according to a preferred embodiment of the present invention.

FIG. 8 shows a sampling plot of switching drain voltage signal vs. time for the power switching device shown in FIG. 6 over a single operational cycle according to a preferred embodiment of the present invention. At each sample time 80, a representation of the voltage waveform present at node 24 is record and preferably stored in memory.

Accordingly, a method for determining the optimum values of time periods $T_{on}$, $T_{off}$, and $T_d$ from a common time origin can consist of the following steps:

1) measuring or deriving data signal values for $L_m$ and $L_{lk}$;
2) measuring using a sampling means voltage signal values for $V_{in}$, and $V_r$;
3) retaining the measured values from steps 1) and 2) using a storage means;
4) using a processing means, calculating:
   a) a secondary resonance frequency;
   b) a data value k and $T_k$ using equations 4 and 5, respectively; and
   c) a $T_{on}$ time and a discontinuity time $T_d$;
5) measuring and storing using a sampling and holding means the voltage at the common connection node of transformer 20 and the switch 24 (i.e. the drain of an exemplary FET device or a collector of an exemplary transistor); and
6) repeat steps 2) through 5) continuously.

The foregoing method eliminates the harmonic distortion associated with the input voltage dependency of the on-times of conventional power converters. The above methods could be equally applied using an array of predetermined values, such as a look up table in memory and still be within the scope of the present invention.

Also in the embodiment shown in FIG. 6, the means for sensing the exemplary drain voltage minimum in time period $T_d$ would preferably be accomplished using a semiconductor over-sampling circuit 68 as is known in the art, rather than through the use of a sense winding 26 as shown in FIG. 1. Such a semiconductor embodiment provides significant improvement in both the cost and the performance of the converter. Since the object of sampling circuit 68 is to preferably sense a point in time where zero current is flowing in transformer 20, monitoring the voltage minimum yields that point, since it coincides with a change of current direction (i.e. zero slope) from the equation v=$V_o$+L di/dt. Thus, at the voltage minimum, switch 24 is not required to provide current to the resonant combination.

Although low-power boost converters can use inductors in lieu of a transformer as the magnetic component, secondary isolation that can be provided only by a transformer is usually desired in practical applications. It should also be noted that the above examples using a quasi-resonant flyback transformer are exemplary only and not meant to be limiting on the scope of the present invention, which is applicable to all variations of power converters that use a voltage flyback approach.

Numerous modifications to and alternative embodiments of the present invention will be apparent to those skilled in the art in view of the foregoing description. Accordingly, this description is to be construed as illustrative only and is for the purpose of teaching those skilled in the art the best mode of carrying out the invention. Details of the embodiments may be varied without departing from the spirit of the invention, and the exclusive use of all modifications which come within the scope of the appended claims is reserved.

What is claimed is:

1. A method for reducing the switching losses in a voltage converter having power factor correction comprising the steps of:

a) recording a first voltage signal using a first measuring means;

b) recording a second voltage signal using a second measuring means;

c) computing at least a first and second time delay from a common time origin using a calculating means;

d) activating a switching device at the end of the first time delay;

e) deactivating said switching device at the end of the second time delay; and f) repeating steps a) through e) in a substantially continuous manner.

2. The method according to claim 1, wherein the first voltage signal comprises an input voltage of said converter.

3. The method according to claim 2, wherein the second voltage signal comprises an output voltage of the converter.

4. The method according to claim 1, wherein the first measuring means comprises the steps of oversampling a node voltage impressed across a transformer using semiconductor sampling devices.

5. The method according to claim 1, wherein the step of computing the first and second time delays further comprises the steps of:

retrieving a plurality of data values from a storage means;

applying said data values to said first and second voltage signals using a first algorithm;

deriving a first coefficient, k;

deriving a second coefficient, $T_k$;

deriving the first and second time delay values using a second algorithm; and temporarily storing the first and second time delay values in the storage means.

6. The method according to claim 5, wherein the step of deriving the first coefficient comprises evaluating the equation $$k = \frac{(T_{on})^2}{[L_m + L_{lk}]\left[T_d + T_{on}\left(1 + \frac{V_{in}}{V_r}\right)\right]}$$

7. The method according to claim 6, wherein the step of deriving the second coefficient comprises the step of evaluating the equation $$T_k = k(L_m + L_{lk})\left(1 + \frac{V_{in}}{V_r} \cdot \frac{L_m}{(L_m + l_{lk})}\right).$$

8. The method according to claim 7, wherein the step of deriving the first time delay value comprises the evaluation of the equation $$T_{on} = T_k \sqrt{T_k^{2+2k(L_m+L_{lk})\cdot T_c}}$$

9. The method according to claim 5, wherein the second time delay value corresponds to a time of a voltage minimum resulting from a natural resonance of a plurality of predetermined reactive elements of the voltage converter.

10. The method according to claim 5, wherein the wherein the plurality of coefficients comprise parameter values proportional to leakage inductance, magnetizing inductance, transformation ratio, resonance and parasitic capacitance associated with a transformer.

11. A method for reducing harmonic oscillations in an input voltage signal of a power converter comprising the steps of:

a) recording a first voltage signal using a first measuring means;

b) recording a second voltage signal using a second measuring means;

c) computing at least a first and second time delay from a common time origin using a calculating means;

d) activating a switching device at the end of the first time delay;

e) deactivating said switching device at the end of the second time delay; and f) repeating steps a) through e) in a substantially continuous manner.

12. The method according to claim 11, wherein the first voltage signal comprises an input voltage of said converter.

13. The method according to claim 12, wherein the second voltage signal comprises an output voltage of the converter.

14. The method according to claim 11, wherein the first measuring means comprises the steps of oversampling a node voltage impressed across a transformer using semiconductor sampling devices.

15. The method according to claim 11, wherein the step of computing the first and second time delays further comprises the steps of retrieving a plurality of data values from a storage means;

applying said data values to said first and second voltage signals using a first algorithm;

deriving a first coefficient, k;

deriving a second coefficient, $T_k$;

deriving the first and second time delay values using a second algorithm; and temporarily storing the first and second time delay values in the storage means.

16. The method according to claim 15, wherein the step of deriving the first coefficient comprises evaluating the equation $$k = \frac{(T_{on})^2}{[L_m + L_{lk}]\left[T_d + T_{on}\left(1 + \frac{V_{in}}{V_r}\right)\right]}$$

17. The method according to claim 16, wherein the step of deriving the second coefficient comprises the step of evaluating the equation $$T_k = k(L_m + L_{lk})\left(1 + \frac{V_{in}}{V_r} \cdot \frac{L_m}{(L_m + l_{lk})}\right), .$$

18. The method according to claim 17, wherein the step of deriving the first time delay value comprises the evaluation of the equation $$T_{on} = T_k \sqrt{T_k^{2+2k(L_m+L_{lk})\cdot T_c}}$$

19. The method according to claim 15, wherein the second time delay value corresponds to a time of a voltage minimum resulting from a natural resonance of a plurality of predetermined reactive elements of the voltage converter.

20. The method according to claim 15, wherein the wherein the plurality of coefficients comprise parameter values proportional to leakage inductance, magnetizing inductance, transformation ratio, resonance and parasitic capacitance associated with a transformer.

* * * * *